United States Patent [19]

Frushour

[11] Patent Number: 5,244,368
[45] Date of Patent: Sep. 14, 1993

[54] HIGH PRESSURE/HIGH TEMPERATURE PISTON-CYLINDER APPARATUS

[76] Inventor: Robert H. Frushour, 2313 Devonshire, Ann Arbor, Mich. 48104

[21] Appl. No.: 792,716
[22] Filed: Nov. 15, 1991
[51] Int. Cl.$^5$ ............................................... B22F 3/08
[52] U.S. Cl. ........................................ 425/1; 422/242; 425/77; 425/DIG. 15; 425/DIG. 26
[58] Field of Search ...................... 425/77, DIG. 26, 1, 425/DIG. 15; 422/242; 423/446

[56] References Cited

U.S. PATENT DOCUMENTS

| | | | |
|---|---|---|---|
| 2,941,248 | 6/1960 | Hall | 425/77 |
| 2,947,610 | 8/1960 | Hall et al. | 425/DIG. 26 |
| 2,992,900 | 7/1961 | Bovenkerk | 425/DIG. 26 |
| 3,088,170 | 5/1963 | Strong | 425/77 |
| 3,123,862 | 3/1964 | Levey, Jr. | 425/77 |
| 3,233,988 | 2/1966 | Wentorf, Jr. et al. | 425/DIG. 26 |
| 3,350,743 | 11/1967 | Ishizuka | 425/77 |
| 3,647,331 | 3/1972 | Kuratomi | 425/77 |
| 4,118,161 | 10/1978 | Kennedy | 425/77 |
| 4,225,300 | 9/1980 | Latter | 425/77 |
| 4,311,490 | 1/1982 | Bovenkerk et al. | 51/307 |
| 4,322,396 | 3/1982 | Strong | 425/77 X |
| 4,385,881 | 5/1983 | Ishizuka | 425/77 |
| 4,481,180 | 11/1984 | Bedere et al. | 425/77 X |
| 4,523,748 | 6/1985 | Latter | 425/77 X |
| 5,190,734 | 3/1993 | Frushour | 422/242 |

*Primary Examiner*—Richard L. Chiesa
*Attorney, Agent, or Firm*—Basile and Hanlon

[57] ABSTRACT

A high pressure/high temperature piston-cylinder-type apparatus has an electrically insulating diamond or cubic boron nitride coating disposed between one or both movable pistons and the surrounding core to electrically isolate the piston or pistons from the surrounding core. The electrically insulating coating is applied to the exterior surface of one or both of the pistons or, alternately, to the inner surface of the core. Electrically insulated, right circular cylindrical pistons are used at both ends of the apparatus resulting in the ability to uniformly compress reaction charges at high temperatures with a much higher length-to-diameter ratio. A ring of electrical insulating material is alternately mounted at the reaction charge end of each piston, with the remaining exterior surface of each piston coated with a thin, elastically insulating layer.

5 Claims, 2 Drawing Sheets

HIGH PRESSURE/HIGH TEMPERATURE PISTON-CYLINDER APPARATUS

BACKGROUND OF THE INVENTION

1. Field of the Invention

The present invention relates, in general, to apparatus and methods for producing diamond crystals.

2. Description of the Art

High pressure/high temperature piston cylinder apparatus are used for a variety of purposes and, specifically, for the production of diamond crystals. In such apparatus, a core of charge material, such as graphite and metal catalyst solvent, is confined within a cylindrical reaction chamber and subjected to high pressure by advancing a moveable piston into one end of the cylindrical chamber, which is open. The other end of the cylinder is closed, and electrical insulation is placed between the cylinder and the backup support block. Electric current is then passed through the reaction charge to heat the sample. A more detailed description of the operation of such a piston-cylinder apparatus is given in U.S. Pat. No. 4,118,161 to Kennedy.

One of the problems associated with the manufacturing process for synthetic diamonds using the piston-cylinder device is uniform compression of a reaction charge with a high length-to-diameter aspect ratio. Sample geometries of this type are necessary for two reasons: first, long cylindrical reaction charges are very desirable because maintenance of a very uniform temperature throughout the sample is critical for production of high quality diamond crystals. As the sample length increases, the end effects of thermal losses are minimized. Second, increasing the sample length allows a higher volume of reaction charge to be processed in the apparatus, resulting in a cost effective method for synthetic diamond production.

It would be desirable to eliminate the closed end of the piston-cylinder apparatus and have two moveable pistons, so that by compressing the reaction charge from both ends, a more uniform sample deformation would occur resulting in isostatic pressure distribution and a uniform thermal profile throughout the sample. However, this cannot be accomplished by using piston-cylinder apparatus of the prior art. In prior art apparatus, one end of the piston-cylinder apparatus is closed in order to provide a means for electrically isolating the cylindrical core so that an electrical current can be passed through the reaction charge for the purposes of heating the sample. This insulation is necessary because the pistons and the cylinder are composed of very hard, ultra high strength steel or, preferably, cobalt cemented sintered tungsten carbide in order to withstand the very high pressures. The very close fit of the piston composed of an ultra high strength material does not permit the use of an insulating gasket, so the moveable piston is not electrically insulated from the bore. The snug fit of the pistons is required to keep the sample from squirting out during compression, thus resulting in an electrical short that interrupts the heating cycle when moveable pistons are used on both ends.

A prior art solution to this problem is to use the well known belt-type high pressure apparatus. Prior art apparatus of the belt-type have been described in numerous patents, such as U.S. Pat. No. 2,941,248 to Hall et al. In the belt-type high pressure apparatus, the pistons taper inwardly toward the charge and the ends of the cylinder, in which the charge is disposed, are correspondingly tapered. Gaskets formed of deformable electrical insulating material, such as pyrophyllite, are disposed between the tapered pistons and the tapered ends of the cylinder and seal the charge in the cylinder.

The gaskets must deform to permit the pistons to advance into the cylinder to compact the charge. A serious disadvantage is that as the tapered pistons move closer together, more and more of the force is supported by the cylinder (shoulder loading) between the side walls of the pistons and the upper and lower portions of the cylinder. This shoulder loading limits the amount of advance of the pistons and the force which can be maintained upon the reaction charge. This is especially problematic during the production of synthetic diamond because there is a significantdifference in the density of graphite and diamond; the density of diamond is about 3.54 while the density of graphite is only about 2.25.

Thus, when the sufficient temperature and pressure conditions are present and the graphite begins to convert to diamond, there is a corresponding reduction of volume in the core of charge material. It is desirable to maintain as constant a pressure as possible; therefore, the piston has to be advanced into the cylinder as the volume reduction is occurring.

BRIEF SUMMARY OF THE INVENTION

This invention relates to an apparatus and a method of constructing a piston-cylinder device so that the pistons are electrically isolated from the cylindrical core, while at the same time maintaining the high strength characteristics required to achieve pressures equal to or greater than 20 kb.

According to the present method, a coating of an electrically insulating material is applied to the exterior surface of each movable piston or, alternately, to the inner diameter of the core. The coating is formed of diamond, diamond-like carbon or cubic boron nitride. The coating may be applied by various coating technologies, such as chemical vapor deposition.

Alternately, a ring-like polycrystalline diamond or polycrystalline cubic boron nitride compact is mounted at the reaction charge end of each movable piston. The remaining exterior surface length of each piston is coated with a thin electrically insulating film.

BRIEF DESCRIPTION OF THE DRAWING

This invention will be better understood when taken in connection with the following description and the drawings in which.

DESCRIPTION OF THE PREFERRED EMBODIMENTS

Figure 1:
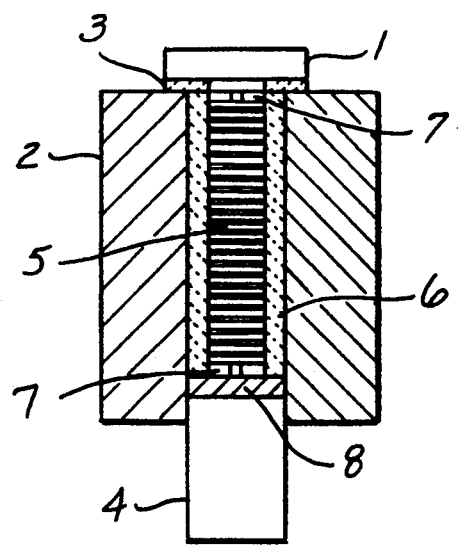
FIG. 1 is a cross sectional view of a reaction charge vessel within a prior art piston-cylinder apparatus.

Descriptions of prior art reaction vessels and high pressure apparatus can be found throughout the literature and by studying various patents on diamond synthesis. More specifically, U.S. Pat. No. 4,118,161 to Kennedy describes a prior art reaction vessel and piston-cylinder device for which the present invention is particularly suited. An apparatus of this type is shown in FIG. 1. The top end of this apparatus consists of a stationary piston 1 which is electrically isolated from the cylindrical core 2 by use of an insulating gasket 3. The bottom end of the core 2 contains a movable piston 4, which just fits inside the chamber of the core 2. The charge material 5 consists of layers of graphite and catalyst that are separated from the core 2 by insulation 6 which extends nearly the entire length of the chamber in the core 2. Graphite temperature controllers 7 facilitate electrical heating of the charge material 5. An electric current is passed through the stationary piston 1 to the graphite temperature controller 7.

The current passes from the upper temperature controller 7 through the charge material 5 to the lower temperature controller 7. The current then passes through a driver element 8 and the movable piston 4 to complete the circuit. The driver element 8 is composed of an easily deformable, electrically conducting material, such as lead or zinc, and provides a lubricating seal between the snug fitting movable piston 4 and the core 2.

Pressurization is achieved by advancing the movable piston 4 into the cylindrical core 2 toward the stationary piston 1. The charge materials 5 are then heated by passage of electrical current therethrough until the required temperature for diamond synthesis is reached.

A problem arises, however, since as the movable piston 4 advances, the charge material 5 adjacent to the driver element 8 begins to compact prior to any compaction of charge material 5 at the opposite end of the cylindrical core 2. Because of the mechanical properties of the graphite in the charge material 5 and of the insulation 6, the force is not uniformly distributed to the top end of the charge 5 via displacement of the movable piston 4 located at the bottom end of the core 2. Since nucleation of synthetic diamond is controlled by the amount of applied pressure, the non-uniform distribution of force in the prior art piston-cylinder apparatus shown in FIG. 1 limits the overall length of the charge 5 that can be effectively used in a production process.

Figure 2:
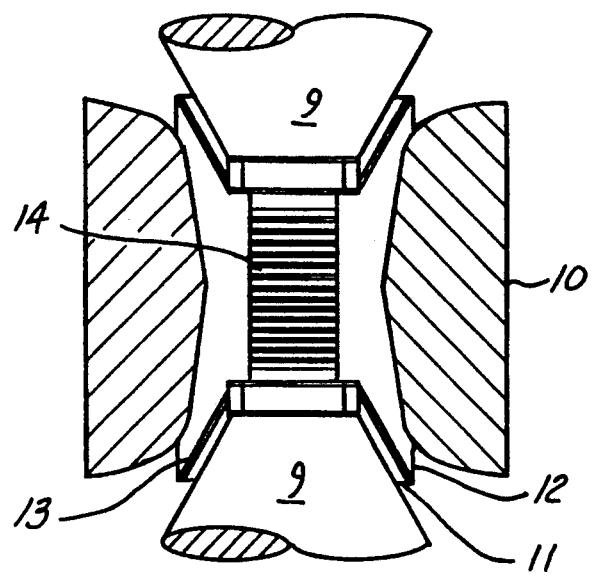
FIG. 2 is a cross sectional view of a reaction charge vessel within a prior art belt-type high pressure apparatus.

The most common method of making synthetic diamond utilizes a belt-type high pressure apparatus. This apparatus is described in U.S. Pat. No. 2,941,248 to Hall. Use of this apparatus allows the sample to be compacted from both ends simultaneously. An apparatus of this type is shown in FIG. 2. The metal anvils (pistons) 9 are separated from a tapered cylindrical core 10 by use of a pair of thermally and electrically insulating, pressure resistant, frustro-conical ceramic gaskets 11 and 12 with a metallic frustro-conical gasket 13 disposed between adjacent gaskets 11 and 12.

The gaskets 11, 12, and 13 must deform to permit the anvil 9 to advance into the core 10 to compact the charge 14. A limitation to use of this apparatus results from the tapered configuration of the anvils 9 and the ends of the core 10. The tapered configuration presents a substantial area that absorbs load from the anvils 9 while limiting the amount the anvil 9 can advance into the core 10.

The foregoing problems can be eliminated by applying an electrically insulating surface, such as a diamond surface, for example, to at least one of the two movable pistons and/or the inner diameter of the core of a modified piston-cylinder apparatus.

Figure 3A:
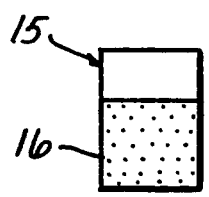
FIGS. 3A and 3B are side and end views, respectively, of the piston designed for the improved piston-cylinder apparatus in accordance with the teachings of this invention.
Figure 3B:
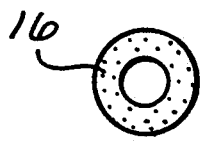

FIGS. 3A and 3B show side and end views, respectively, of a piston 15 which has a very thin layer 16 of diamond bonded to its exterior surface. The diamond layer 16 presents a continuous surface that has very high wear resistant properties, high compressive strength, and provides electrical insulation. The piston 15 can be directly substituted for the piston 4 in FIG. 1. Use of the piston 15 eliminates the requirement of a closed end for the piston-cylinder apparatus shown in FIG. 1.

Figure 4:
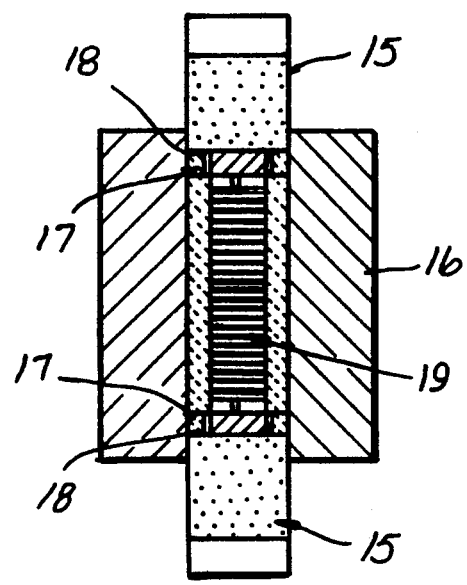
FIG. 4 is a partial cross sectional view of another embodiment of the improved piston-cylinder apparatus in accordance with the teachings of this invention.

Referring now to FIG. 4, by using the modified piston 15, a piston-cylinder apparatus is constructed that utilizes movable pistons 15 on both ends of the core 16 because of the electrically insulating properties of the diamond coating layer 16. This modification simplifies the use of the apparatus and allows a longer reaction charge to be uniformly compacted. When using the modified piston 15 it is also necessary to modify the driver element 8 shown in FIG. 1. The modified driver assembly 17 in FIG. 4 contains an nonconductive ring 18 to electrically isolate the charge material 19 from the outer portion of the lead or zinc driver element that comes in direct contact with the core 16. The ring 18 can be constructed of any number of materials; however, more preferable is a ceramic (such as pyrophyllite) or a salt (such as NaCl).

Another advantage of using a piston-cylinder apparatus constructed according to the teachings of this invention is the lower cost of operation resulting from the elimination of the gasket 3 required at the closed end of the prior art apparatus described above and shown in FIG. 1.

Yet another advantage is that since both ends of the inventive apparatus are of identical construction, the thermal profile of heat distribution throughout the reaction charge is more uniform.

The diamond surface layer 16 can be applied to the apparatus components in any number of ways. One method is to use chemical vapor deposition to uniformly deposit a thin, tightly bound coating of diamond or diamond-like carbon.

Figure 5A:
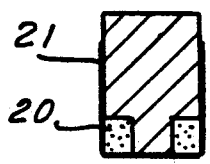
FIGS. 5A and 5B are side cross sectional and end views, respectively, of the piston modified by another method in accordance with the teachings of this invention.
Figure 5B:
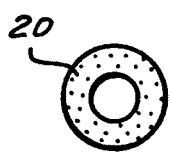

Another method of electrically isolating the pistons 15 from the cylindrical core 16 is to use a polycrystalline diamond compact that does not have an electrically conducting matrix as a filler or bonding agent. This compact can be in the form of a ring 20, FIGS. 5A and 5B, mounted at one end of the piston and having an outer diameter that closely matches the inner diameter of the core 16. The remaining diameter of the piston is slightly smaller in diameter and can be coated with a thin insulating film 21, such as TEFLON or MYLAR or other electrically insulating materials, that does not have to have high compressive strength characteristics. This piston can be substituted for the piston 15 in FIG. 4.

Yet another method of electrically isolating the pistons from the cylindrical core is by replacing the diamond surface layer mentioned above with diamond-like carbon or cubic boron nitride.

Figure 6:
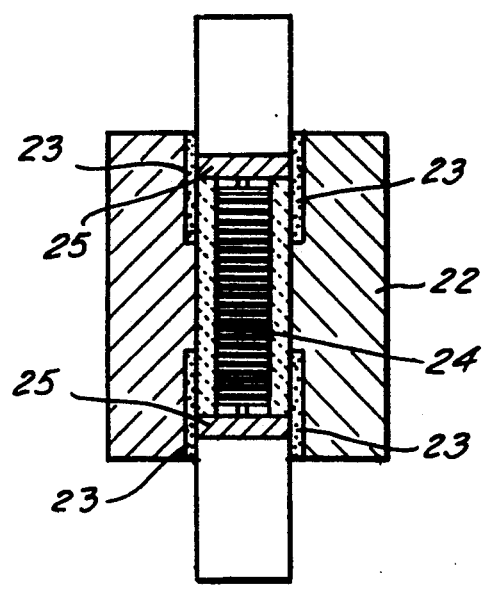
FIG. 6 is a cross sectional view of yet another embodiment of the improved piston-cylinder apparatus of this invention.

Another method of electrically isolating the pistons from the cylindrical core is by applying a diamond surface to the inner diameter of the core. FIG. 6 shows a piston-cylinder apparatus that has been modified by coating each end of the inner diameter of the core 22 with a thin layer of diamond 23. Although the diamond coating 23 is shown at each end of the core 22, it is understood that the coating could be applied to the full length of the core or only to one end of the core. The length of the coating on the core 22 must exceed the limit of travel for one of the zinc-lead drivers 25 in order to cause electric current to flow through the charge 24.

What is claimed is:

1. A high pressure, high temperature piston-cylinder apparatus for converting a reaction charge comprising:
   a cylindrical core having a hollow, right circular cylindrical interior chamber;
   at least one movable piston movable through one end of the hollow chamber to exert pressure on a reaction charge disposed within the chamber, the piston having a right circular cylindrical shape and an outer diameter closely matching an inner diameter of the hollow interior chamber in the core;
   means for supplying electric current to the reaction charge after the piston has pressurized the reaction charge; and
   an electrically insulating material coating applied to one of the exterior surface of the piston and the inner surface of the core.

2. The apparatus of claim 1 wherein the coating is selected from the group consisting of diamond and cubic boron nitride.

3. The apparatus of claim 1 further comprising:
   two movable right circular cylindrical pistons disposed at and movable through opposite ends of the hollow chamber, the electrically insulating material coating applied to one of each piston and the core.

4. A high pressure, high temperature piston-cylinder apparatus for converting a reaction charge comprising:
   a cylindrical core having a hollow, right circular cylindrical interior chamber;
   at least one movable piston movable through one end of the hollow chamber to exert pressure on a reaction charge disposed within the chamber, the piston having a right circular cylindrical shape and an outer diameter closely matching an inner diameter of the hollow interior chamber in the core;
   means for supplying electric current to the reaction charge after the piston has pressurized the reaction charge;
   an electrically insulating ring mounted on and surrounding a reaction charge end of the piston; and
   an electrically insulating film applied to the exterior surface of the piston and extending from the ring.

5. The apparatus of claim 4 wherein the ring is formed of one of polycrystalline diamond and polycrystalline cubic boron nitride.

* * * * *